(12) United States Patent
Hohne et al.

(10) Patent No.: US 7,039,390 B1
(45) Date of Patent: May 2, 2006

(54) METHOD AND SYSTEM FOR SENDING TEXT MESSAGES

(75) Inventors: Matthias Hohne, Langewahl (DE); Gergely Ruda, Budapest (HU); Geza Olah, Budapest (HU)

(73) Assignee: Siemens Aktiengesellschaft, Munich (DE)

( * ) Notice: Subject to any disclaimer, the term of this patent is extended or adjusted under 35 U.S.C. 154(b) by 451 days.

(21) Appl. No.: 10/401,710

(22) Filed: Mar. 28, 2003

(30) Foreign Application Priority Data

Apr. 29, 2002 (DE) .................. 102 19 150

(51) Int. Cl.
*H04M 11/00* (2006.01)
*H04Q 7/20* (2006.01)

(52) U.S. Cl. ...................... 455/406; 455/466

(58) Field of Classification Search ........ 455/406–409, 455/466, 558; 379/114.15, 114.2, 114.28
See application file for complete search history.

(56) References Cited

U.S. PATENT DOCUMENTS 6,816,721 B1 * 11/2004 Rudisill .................. 455/406
2002/0123359 A1 * 9/2002 Wei et al. .................. 455/466
2002/0193127 A1 * 12/2002 Martschitsch ............ 455/466
2003/0008635 A1 * 1/2003 Ung et al. ................. 455/408
2003/0050043 A1 * 3/2003 Ohrstrom et al. .......... 455/406
2003/0119478 A1 * 6/2003 Nagy et al. ................ 455/408
2003/0162526 A1 * 8/2003 Ogman et al. ............. 455/406

FOREIGN PATENT DOCUMENTS

| EP | 0 753 957 | 1/1997 |
| WO | WO 98/56202 | 12/1998 |
| WO | WO 01/37537 | 5/2001 |
| WO | WO 02/25921 | 3/2002 |
| WO | WO 02/25922 | 3/2002 |
| WO | WO 02/25923 | 3/2002 |

\* cited by examiner

*Primary Examiner*—Benny Q. Tieu
(74) *Attorney, Agent, or Firm*—Bell, Boyd & Lloyd LLC

(57) ABSTRACT

A method and system are provided for sending text messages in a telecommunication network, in particular in an intelligent network, allowing charge acceptance, wherein a subscriber is allowed to send text messages, which have already been charged for and which are then made available to the relevant recipient either predestined with an address or freely available.

8 Claims, 1 Drawing Sheet

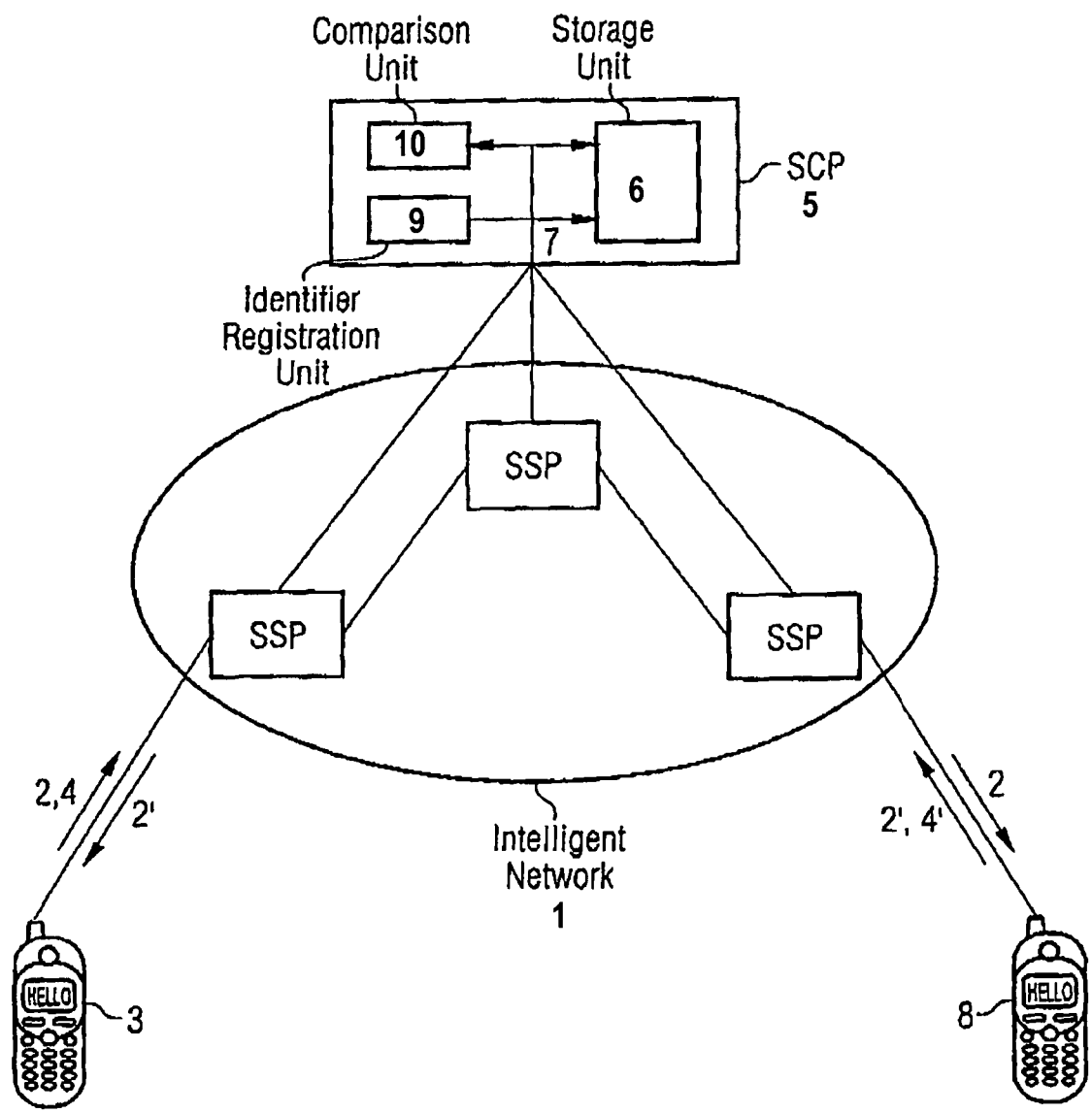

METHOD AND SYSTEM FOR SENDING TEXT MESSAGES

BACKGROUND OF THE INVENTION

The present invention relates, generally, to a method for sending text messages in a telecommunication network and, in particular, to an intelligent network and a system for implementing the method.

Mobile telecommunication terminals (mobile phones) are widely used both in the business and the private sectors due to the significant advantages they have compared with fixed network terminals. The possibility of practically unlimited accessibility even for subscribers with a high level of personal mobility has been one the main reasons for this, with the full coverage of the GSM network allowing international use too. The operators of terrestrial cellular networks, such as the GSM network, also offer subscribers services not offered by the fixed network. An example of such a service is the receiving and sending of short text messages, generally known as SMS (Short Message Service) messages.

SMS is a GSM network service for sending short text messages of up to 160 characters. The data for the SMS is transferred in the signaling channel and not a useful channel, so SMS data can be transferred to one of the relevant network operator's switching points, even during a call. If the relevant recipient terminal of the short message is not accessible at the time, the message is buffered in the switching center for a specific period (usually between 48 hours and 2 weeks) and forwarded at a later time, when the recipient terminal is once again accessible.

The SMS service therefore offers an uncomplicated and fast option for sending texts with a typically maximum length of 160 characters via cellular networks. Ongoing and foreseeable developments in this area will make greater use of further applications such as reservation confirmations, advertising or bank transactions. Marketing specialists for the international mobile telephone suppliers have recognized the significance of these and will disseminate these new applications beyond the current target groups (who just use text messages for correspondence). An example of this might be the further developments of the original SMS service, known as EMS (Enhanced Messaging Service) or MMS (Multimedia Messaging Service).

The increasing dissemination of mobile telecommunication terminals means that what is known as the prepaid method is also a significant component of the payment system. This method of payment, also sometimes referred to as the "credit method" is the original name for the option of purchasing an SIM card with an associated maximum total charge as credit against prepayment. Calls can then be made with this card for as long as the remaining credit allows. Once the credit has been used up, a new card must be purchased and inserted in the device or the card must be topped up.

The prepaid method is now used increasingly for mobile telecommunication because of its significant advantages from the users' and operators' points of view. Users, for example, are not subject to a fixed monthly basic fee and long-term contracts. The prepaid method also allows total cost control and can be used by people below the age of 18. From the operators' point of view there is no billing risk with the prepaid method and costs can be saved due to the fact that credit checks are not required. Disadvantages from the users' point of view are the slightly to significantly higher usage-based costs of calls and the threat of the card credit lapsing, if calls are not made over a certain period.

It is also a significant disadvantage that replies can no longer be sent to incoming messages with mobile telephones with a prepaid card agreement when the credit is used up. Such replies cannot be sent, because when a credit check is carried out for the user in the switching center, lack of credit means that use of both the call service and the SMS service is refused. The situation is particularly problematic when the subscriber is required to sent a reply to a received message. The communication partner in question does not generally know that the reply could not be sent due to the expiration of the prepaid credit; and therefore, there is no reply.

Acceptance of usage costs (traffic charges) by the destination connection dialed is known as the R call or reverse charging in telecommunication technology; however, this principle is not appropriate for transfer to the SMS service. A current example of this is automatic reverse charging in X.25 packet networks, with which the dialed packet connection accepts the volume costs of the data connection. In the public telephone network reverse charging is used for the operator-supported R call, with which the subscriber called agrees to accept the connection costs of the call in question. This feature of telecommunication networks is, of course, only possible with switching communication networks. Transfer to the short message service (i.e., acceptance of cost for SMS messages) is, therefore, not yet possible.

In view of the problem described, an object of the present invention is to specify a method for extending the possibilities for using mobile telephone services, in particular on a prepaid basis, and a system for implementing the method.

SUMMARY OF THE INVENTION

This object is achieved with a method of the type mentioned above with the following stages according to the present invention: a first text message is compiled via a first terminal and marked with a first charge acceptance code; the first text message is sent to a central service control point; an assignment formula, which includes identifiers of the first and a second terminal, is created to stipulate charge acceptance and the assignment formula is stored in a storage unit; the first text message is forwarded to a second terminal and displayed with a notice of charge acceptance; a second text message is compiled on the second terminal and marked with a second charge acceptance code; the second text message is sent to the central service control point for execution of the charge acceptance; and the second text message is forwarded to the first terminal.

The advantages of the present invention are, in particular, that a simple and also very effective method can be achieved for the dialed destination connection (first terminal) to accept the charges incurred when sending an SMS message. By marking a first text message with a first charge acceptance code, it is then particularly advantageously possible for any subscriber to send a text message, with which they can signal acceptance of the cost of a reply to this message in a binding fashion. Acceptance of cost using the method according to the present invention allows subscribers to accept the costs of text messages they receive. It is also possible for a subscriber to send not just a single message but also message packets to other terminals. For this, the number of SMSs in the message packet should be specified. This can be done, for example, by a corresponding input in the charge acceptance code, so that the number of freely available SMSs is input in the assignment formula. The option of unlimited cost acceptance is then possible; this option should expediently be linked to a specific address. For example, parents can accept the costs of SMSs sent to them by their children without any limit. In this case, the input in the list or assignment formula must be appropriately marked, so that this is not deleted when the reply SMS message is sent but has to be specifically canceled. The cancellation operation is advantageously carried out by SMS.

According to this principle it is therefore possible to "attach" a reply SMS message to a sent SMS message, which only can be sent back to the address of the first terminal or, alternatively, is freely available; i.e., can be sent to any other terminal. Freely available SMSs are marked with a different service number, so they can be distinguished from the SMSs which are charged for according to the known method. The freely available SMSs are managed in an appropriate list for this purpose or in the assignment formula. If, when the second SMS is sent, such an input is found, the SMS is sent to the freely selected address, where the stored call number of the sender of the first SMS message is required for charging purposes only. As such, the subscriber, who is connected for communication purposes via the second terminal, is able to reply to an SMS message, which was sent from a first terminal, without incurring any costs. On the other hand a predestined SMS message (i.e., an SMS message with an already specified address), ensures that this SMS message cannot be used in any other way.

The first text message is sent in a particularly advantageous fashion to a central service control point, by a corresponding service reading both the destination call number (i.e., the call number to which the first text message is to be sent), and the call number of the first terminal from the first text message, and combining them in an assignment formula. Such an assignment formula can, for example, be in the form of call number pairs, with the destination call number and the sender call number input as a number duplex.

The assignment formula is then buffered in the central service control point, preferably in a storage unit for this purpose. When the text message has been forwarded to a second terminal, which is the input recipient of the message, this message is displayed at the second terminal, with the message being marked in a particularly advantageous fashion, so that the relevant subscriber identifies that charge acceptance is offered by the first terminal.

The subscriber of the second terminal can, in this case, compile a second text message, mark this to the effect that charge acceptance is required and send it to the central service control point. It is then verified here whether there is an input in the buffered assignment formula, which corresponds to the identifiers of the second and first terminals. If this is so, (i.e., if the subscriber at the first terminal has signaled acceptance of charges for the call number of the second terminal on compilation of the first text message), the second text message is forwarded to the first terminal.

With the system according to the present invention, an option is specified for implementing the method described above. Here, the central service control point has an identifier registration unit, which is designed to detect an identifier (specifically the MSISDN) of the sender terminal and the destination connection on receipt of a text message, combine these in an assignment formula and store this in a storage unit for this purpose. The central service control point also has a comparison unit to verify charge acceptance.

It is preferable for the method that for the purposes of executing charge acceptance the second text message is charged for via the first terminal and via an IN service. This is a method stage known from telecommunication, in which the costs of the first text message are charged as standard. As such, the subscriber does not receive additional bills when using the cost acceptance service. When charging for SMS messages via the IN service, the debit entry is also advantageously only made, when the second text message is actually sent.

In one embodiment of the method according to the present invention, the text message is marked by adding an IN service code to the automatic call-up of an IN service element in the central service control point. The IN service code is generally a sequence of three numbers specified by the service provider or network operator in the call number system of the intelligent network (IN) for access to a specific IN service. The service code must be selected by the caller to obtain a specific service. Use of the service support for an intelligent network according to the present invention is particularly advantageous, as the method according to the present invention can be introduced particularly quickly and easily as a result. Of course, other embodiments are also possible.

It is, therefore, particularly advantageous that compilation of the assignment formula to stipulate charge acceptance and storage of this in a storage unit are achieved by an IN service for this purpose. The use of such services allows the method according to the present invention to be introduced particularly quickly and easily.

It is also particularly advantageous that charge acceptance for a second text message is also executed via a further IN service element, with a sender identification for the second text message first being read as the identifier and this identifier then being compared with the values in the buffered assignment formula. Costs are then accepted and the second text message forwarded to the first terminal, when the comparison reveals the existence of the read sender and recipient identification in the stored values.

In a particularly advantageous embodiment, the text message is marked with a charge acceptance code via a configurable menu input. This is a particularly user-friendly variation of the solution according to the present invention, in which the subscriber, for example, no longer has to input the IN service code individually by hand. Setting a corresponding menu input means that when this function is selected, the input destination call number is extended to include the service code used.

A further advantage of the solution according to the present invention is that other IN service codes can be added when marking the text message. It is, therefore, possible to add a corresponding code, which is used to call up an IN service, with the effect that receipt of this message is signaled for the recipient by a specific signal (ring tone). Of course, other embodiments are possible here too.

Additional features and advantages of the present invention are described in, and will be apparent from, the following Detailed Description of the Invention and the Figures.

BRIEF DESCRIPTION OF THE FIGURES

FIG. 1 shows a diagram of a preferred embodiment of the system for sending text messages in accordance with the teachings of the present invention.

DETAILED DESCRIPTION OF THE INVENTION

FIG. 1 shows a diagram of a preferred embodiment of the system according to the present invention, in which a first terminal 3 is connected via an intelligent network 1 to a second terminal 8. A text message 2 is compiled on the first terminal 3 and marked with a first charge acceptance code 4.

The charge acceptance code 4 is added as an IN service code to the identification number of the recipient terminal (second terminal 8).

When the text message 2 has been sent by the first terminal 3, access to the IN "charge acceptance" service is automatically selected by the IN service code added to the code. The function of the intelligent network 1 is based on the following basic principle: the intelligence for setting up a telecommunication connection no longer is no longer located totally in the largely service-neutral service switching points (SSP) of the network 1 but more in a central service control point (SCP) 5, the service logic of which is utilized for every connection set-up from the service switching point. Central management of the service logic has the advantage that it is lower cost and takes much less time. Thus, for the network operator, new services are implemented and made available to customers more quickly than is conventionally the case in the network 1.

The sent text message 2 is forwarded directly from there to the service control point 5. The first text message 2 is first forwarded to the identifier registration unit 9 of the central service control point 5, in which the identifiers of the terminals 3, 8 are compiled from the connection data. These identifiers can, in particular, represent the call number pairs of the two terminals 3, 8. The IN service then uses the compiled identifiers to create a corresponding assignment formula 7, which is buffered in a corresponding storage unit 6 of the central service control point 5.

The first text message 2 is then forwarded to the second terminal 8. Here, the first text message 2 is shown on a corresponding display, with a corresponding notice, which informs the user of the terminal 8, that the subscriber of the first terminal 3 has offered to accept the charge.

In this case, the subscriber of the second terminal 8 can compile a second text message 2' on the second terminal 8 and assign this a second charge acceptance code 4'. This can, for example, be a corresponding IN service code.

The second text message 2' is then sent. The text message 2' is sent automatically to the central service control point 5 and, in particular, to a comparison unit 10. Verification of charge acceptance is carried out in the comparison unit 10.

First, the sender identification of the second text message 2' (i.e., the identifier of the second terminal 8), is determined and then a search is carried out for the recipient identification of the second text message 2' (i.e., the identifier of the first terminal 3), in the stored assignment formula 7.

The charge is accepted and the second text message 2' forwarded to the first terminal 3 when the comparison reveals the existence of the read sender and recipient identifications in the values stored in the assignment formula 7.

Although the present invention has been described with reference to specific embodiments, those of skill in the art will recognize that changes may be made thereto without departing from the spirit and scope of the present invention as set forth in the hereafter appended claims.

The invention claimed is:

1. A method for sending text messages in an intelligent telecommunication network, the method comprising the steps of:
   compiling a first text message via a first terminal and marking the first text message with a first charge acceptance code;
   sending the first text message to a central service control point;
   compiling an assignment formula containing appropriate identifiers for the first and second terminals to stipulate charge acceptance and storage of the assignment formula in a storage unit;
   forwarding the first text message to the second terminal and displaying the first text message with notice of charge acceptance;
   compiling a second text message on the second terminal and marking the second text message with a second charge acceptance code;
   sending the second text message to the central service control point for executing the charge acceptance; and
   forwarding the second text message to the first terminal.

2. A method for sending text messages in an intelligent telecommunication network as claimed in claim 1, the method further comprising the step of charging for the second text message via the first terminal and via an IN service to execute a charge acceptance.

3. A method for sending text messages in an intelligent telecommunication network as claimed in claim 1, wherein the steps of marking the first and second text messages include adding an IN service code in each instance for automatic call-up of an IN service element.

4. A method for sending text messages in an intelligent telecommunication network as claimed in claim 1, wherein after the step of compiling the assignment formula, the method further comprises the steps of:
   automatically calling up a first IN service element to create the assignment formula from the identifiers of the first and second terminals; and
   storing the assignment formula in the storage unit.

5. A method for sending text messages in an intelligent telecommunication network as claimed in claim 1, wherein after the step of sending the second text message to the central service control point, the method further comprises the steps of:
   automatically calling up a second IN service element for reading the sender identification of the second text message; and
   searching for recipient identification of the second text message in the stored assignment formula, with the charge being accepted and the second text message being forwarded to the first terminal, when the comparison reveals existence of the read sender and recipient identifications in values stored in the assignment formula.

6. A method for sending text messages in an intelligent telecommunication network as claimed in claim 1, wherein the steps of marking the first and second text messages with a charge acceptance code is performed via a configurable menu input.

7. A method for sending text messages in an intelligent telecommunication network as claimed in claim 1, wherein the steps of marking the first and second text messages include the addition of further IN service codes to the markings.

8. A system for sending text messages in an intelligent telecommunication network, the system comprising first and second terminals for compiling and receiving text messages, which are connected via a central service control point of the intelligent telecommunication network, wherein the central service control point includes an identifier registration unit to record identifiers of the first and second terminals and to create an assignment formula, an identifier storage unit to store the assignment formula, and a comparison unit to verify charge acceptance by comparing a stored assignment formula with a received identifier pair.

* * * * *